UNITED STATES PATENT OFFICE.

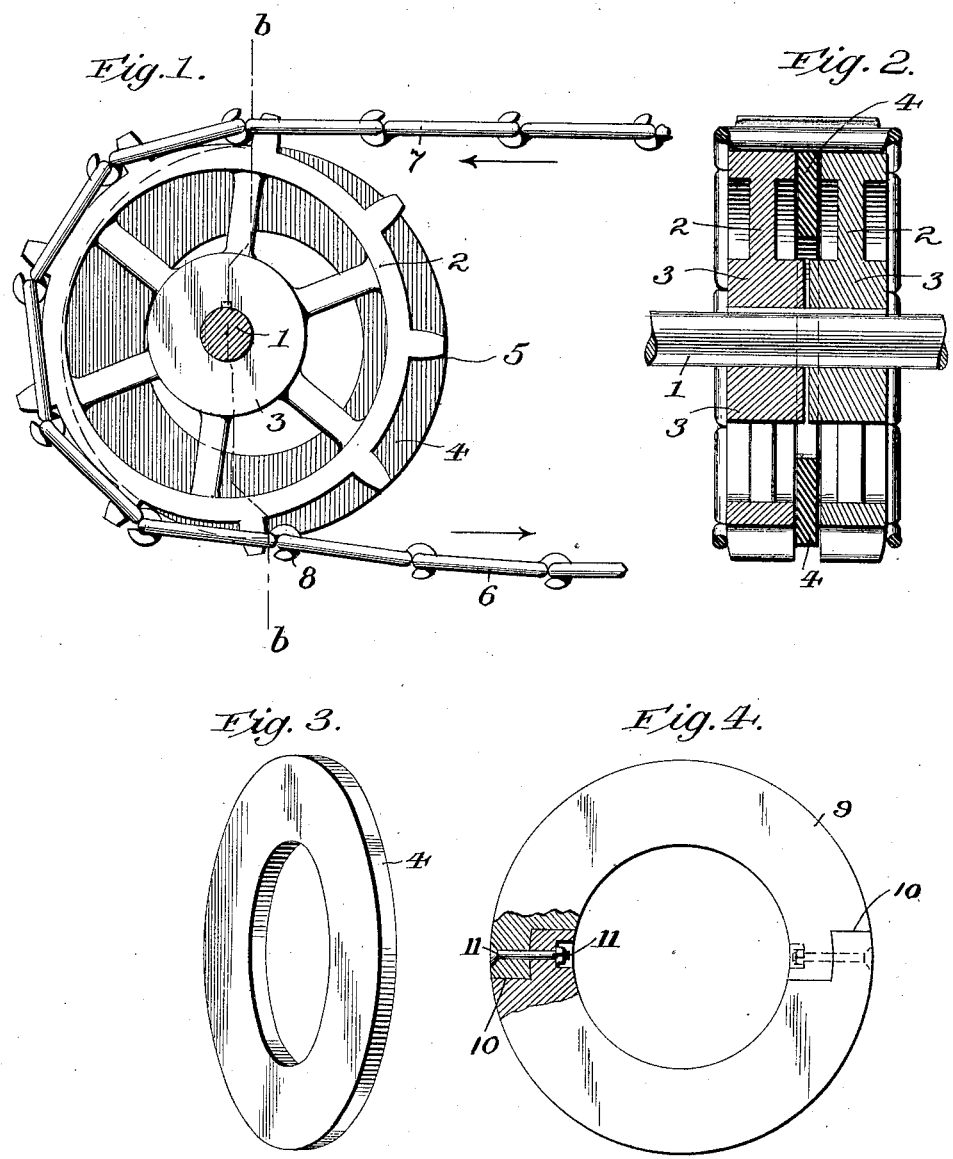

JASPER W. HOUSTON, OF SELMA, LOUISIANA.

SPROCKET-GEARING.

1,055,912.  Specification of Letters Patent.  Patented Mar. 11, 1913.

Application filed April 29, 1912. Serial No. 693,806.

*To all whom it may concern:*

Be it known that I, JASPER W. HOUSTON, a citizen of the United States, residing at Selma, in the parish of Grant and State of Louisiana, have invented certain new and useful Improvements in Sprocket-Gearing, of which the following is a specification.

This invention relates to chain sprockets and particularly to a chain-stripping device therefor, adapted to assist in stripping the chain from the sprocket and to prevent the chain from catching and winding around the sprocket in case the chain breaks.

In general the device may be said to consist of a disk loosely mounted on the sprocket and bearing against the chain at the point at which it leaves the sprocket, the pressure of the disk upon the chain being effected by gravity and by the pull of the working side or run of the chain.

Preferred forms of the device are shown in the accompanying drawing, in which:

Figure 1 is a side elevation of a sprocket having my invention applied; Fig. 2 is a section on the line *b—b* of Fig. 1; Fig. 3 is a perspective view of one form of stripper disk; and Fig. 4 is an elevation partly broken away of a sectional stripper disk used in some cases.

Referring to the drawings, 1 is the sprocket shaft and 2, 2 are sprockets of usual form keyed thereon, with their hubs 3 in contact but spaced slightly apart at their rims to receive an intervening disk, or ring 4 having an outside diameter intermediate between the root diameter and the outside diameter of the sprockets. The sprockets 2 therefore form in effect a double sprocket. The inside diameter of the ring 4 and the diameter of the hubs 3 of the sprockets are such relatively to each other that the ring 4 may move transversely to the shaft 1 until it extends slightly beyond the teeth of the sprockets as shown for example at 5. The effect of this arrangement is that when a chain 6 is driven by the sprocket the working run 7 of the chain hugs the sprocket closely, forcing the disk 4 downward and stripping the return run of the chain of the sprocket as at 8. Should the chain break this action will prevent the return run of the chain from catching and winding around the sprocket. This catching of broken chains on sprockets has heretofore been the cause of great damage particularly in the case of conveyer chains, and the difficulty has been largely obviated by my invention.

In some cases it is desirable to cast the double sprocket in one piece in which case a divided ring 9 having a scarfed joint 10 held together by bolts 11 may be used in place of the solid disk 4. Any other form of divided ring might be used with such a sprocket.

The device is simple and readily installed and is efficient in operation. It may be applied, as will be obvious, regardless of the distance between the sprockets and hence is adaptable to flight conveyer chains and the like in which the sprockets are some distance apart, as well as to the particular forms shown in the drawings.

While I prefer to place the disk between two spaced portions of the sprocket rim, this is not essential, for obviously the disk may be arranged in any relation to the sprocket permitting it to engage and strip the chain according to the principle set forth.

Having thus described my invention, what I claim is:

1. The combination of a sprocket; a chain running thereon; and a member movable transversely of the axis of the sprocket and adapted to be engaged by the chain on opposite sides of the sprocket whereby the working run of the chain causes said member to move to force the return run of the chain from the sprocket.

2. The combination of a sprocket; a chain running thereon; and a rotary member movable transversely of the axis of the sprocket and bearing upon the chain at the point where it leaves the sprocket to strip the chain from the sprocket.

3. The combination of a spocket; a chain running thereon; and a disk mounted to move transversely of the axis of the sprocket and adapted to engage the chain at opposite sides thereof, said disk having a diameter greater than the root diameter of the sprocket.

4. The combination of a sprocket; a chain running thereon; and a disk mounted to move transversely of the axis of the sprocket and adapted to engage the chain at opposite sides thereof, said disk having a diameter greater than the root diameter of the sprocket and less than the outside diameter over the teeth of the sprocket.

5. The combination of a sprocket having two rim portions spaced apart; a chain running on said sprocket and engaging both said rim portions; and a disk mounted between said rim portions and having a diameter greater than the root diameter of the sprocket.

6. The combination of a sprocket having two sets of teeth upon its periphery, said sets of teeth being separated from each other by an intervening annular space; a chain running on said sprocket and engaging both said sets of teeth; and an annular member, mounted in said annular space between the sets of teeth, free to move transversely of the axis of the sprocket and of greater outside diameter than the root diameter of the sprocket.

In testimony whereof I have signed my name to this specification in the presence of two subscribing witnesses.

JASPER W. HOUSTON.

Witnesses:
H. WATSON,
SAM MCCARTY.